UNITED STATES PATENT OFFICE.

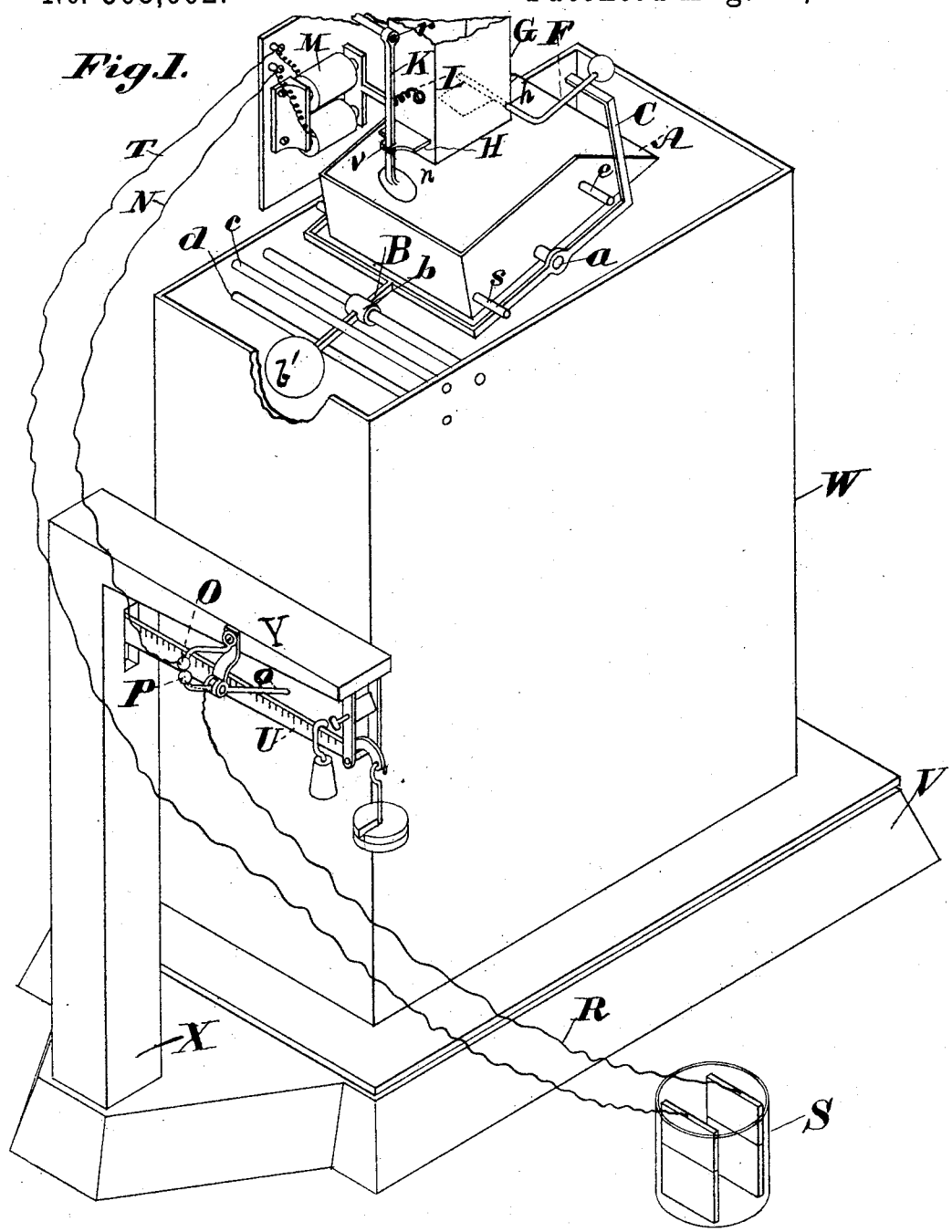

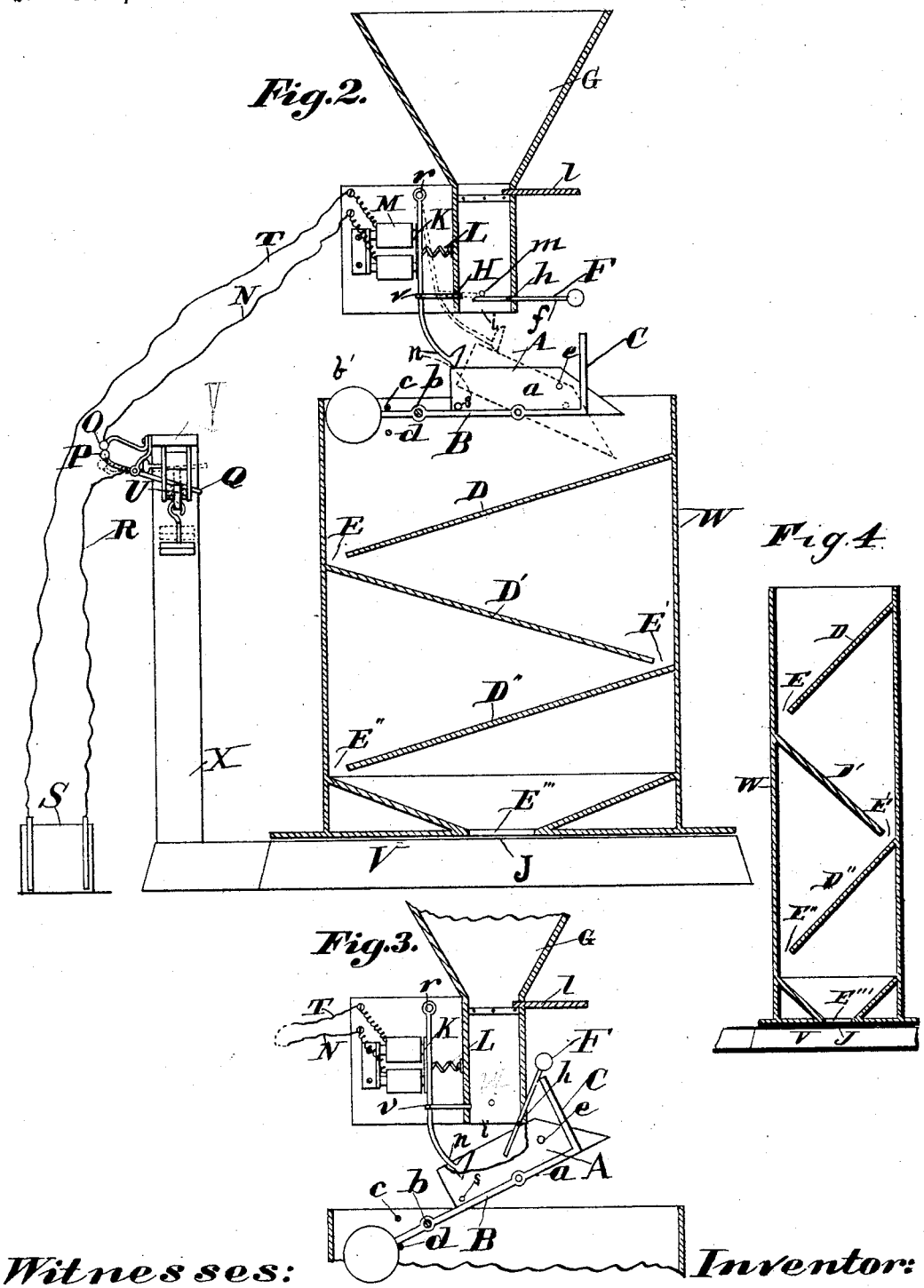

BENJAMIN R. FOSTER, OF ST. LOUIS, MISSOURI.

AUTOMATIC GRAIN-SCALE.

SPECIFICATION forming part of Letters Patent No. 368,662, dated August 23, 1887.

Application filed December 2, 1886. Serial No. 220,537. (No model.)

*To all whom it may concern:*

Be it known that I, BENJAMIN R. FOSTER, a citizen of the United States, residing at St. Louis, in the State of Missouri, have invented certain new and useful Improvements in Automatic Weighing-Scales; and I hereby declare the following to be a full, clear, and exact description of the same, reference being had to the accompanying drawings, wherein—

Figure 1 is a perspective view of a self-weighing scale embodying my invention. Fig. 2 is a side elevation of an ordinary platform-scale, with the devices embodying my invention shown in longitudinal vertical section. Fig. 3 is a vertical section showing in detail the hopper, the main or tilting valve of the hopper, the supplemental or slide valve with electro-magnet for operating the same, and the tilting or oscillating pan or receiver. Fig. 4 is a diagram showing the inclines D D', &c., at an angle of forty-five degrees to the horizon.

Like letters refer to like parts wherever they occur.

My present invention relates to devices for weighing cereals and similar substances, and has for its object to automatically weigh running grain, cut it off, and throw it into a receiver.

The main elements of the apparatus are a hopper, a tilting pan or receiver, and a scale, the hopper having a main valve controlled by the tilting pan or receiver, and a supplemental valve controlled through an electric circuit which is made and broken by the scale-beam, and a series of inclines or equivalent devices for retaining the grain on the scale and interrupting the circuit while the tilting receiver is righting itself.

There are other and minor features of my invention, all of which will hereinafter more fully appear.

I will now proceed to describe my invention more fully, so that others skilled in the art to which it appertains may apply the same.

In the drawings, X indicates an ordinary scale, having a scale-beam, U, and platform V. Upon the platform V is arranged a box or casing, W, provided on its interior with a series of alternately-inclined partitions or diaphragms, D D' D'', between the lower ends of which partitions and the box W are passages E, E', and E'', for the escape of the grain or like article; and in the bottom of box or casing W is a final opening, E''', for the escape of the material from the scales, the whole forming a zigzag path, over which the grain must pass before the scale-beam U falls.

In the upper part of box or case W, on a suitable cross bar or rod, is journaled, as at $b$, a forked or bifurcated lever, B, on which is journaled, as at $a$, a tilting or rocking receiving-pan, A. The bifurcated lever B is counterweighted, as at $b'$, so as to counterbalance the pan A and something less than its load, and the movement of said lever B (or its oscillation) is restricted or limited by stops or cross-rods $c$ and $d$, attached to box W. The extent of oscillation of receiving-pan A is also restricted or limited by projections or pins $s$ and $e$ on the pan, which strike or rest on the tines of the forked lever B. It will be noted that the pan A has in reality two axes or points of movement—first, that of the bifurcated lever B, as at $b$, on which it rocks just before its load is complete, and, secondly, its own axis $a$, on which it rocks to discharge its load when its equilibrium is disturbed, as will hereinafter appear.

Directly over the oscillating or tilting pan A is placed the fixed hopper G, through which the grain or other material to be weighed passes. This hopper G is provided with the usual slide or valve, $l$, for permanently arresting the flow of the material when desired. It is also provided with two automatic valves, one of which, F, is the main valve and is actuated by the rocking lever B, and the other or supplemental valve, H, is actuated or controlled from the scale-beam U through an electric current.

The first or main valve, F, is an oscillating leaf or flap valve, pivoted as at $h$, and having a counterweighted arm or stem, $f$, the weight of which is sufficient to support the weight of the flowing grain, and the upward swing of said valve—beyond a certain limit—is restricted by a pin, $m$. This valve is operated by a vertical rod, C, attached to the outer end or one tine of bifurcated lever B; and it will be apparent, as seen in Fig. 3, that when the pan A is in position to receive its load the counterweight of valve F will be raised, so as to allow the valve F to be opened by the flowing grain or other material, and as soon as the pan is loaded and sinks (see Fig. 2) the supporting-arm C will be withdrawn and the valve F will close against the flowing grain.

H indicates the supplemental valve, which is a sliding valve whose outer end is pivoted to a lever, K, as at $v$, the lever K being pivoted at one end, as at $r$, and provided with a spring, L, of sufficient strength to move the lever K to close the supplemental valve H against the flowing grain. On the lower end of the lever K is an enlargement or knob, $n$, which, when the lever is actuated by the spring L to close valve H, will in its movement strike the heaped-up grain in one end of pan A and move it toward the axis $a$ sufficiently to disturb the equilibrium of the pan and to cause it to tilt (as indicated in dotted lines, Fig. 2) and discharge its load.

M indicates an electro-magnet, the armature of which is attached to the pivoted lever K of valve H.

Secured to the cross-arm Y, over the scale-beam U, is a bracket, which supports a fixed knob, O, and a pivoted movable knob, P, (properly insulated,) the latter of which has an arm or lever, Q, which stands in the path of scale-beam U, the whole forming a circuit-breaker, and the electro-magnet M and circuit-breaker O P are connected with each other and with a suitable battery, S, by the circuit-wires N R T.

By means of the above devices the circuit is broken, the lever K released, and the supplemental valve H closed the instant the pan A has its full load and the scale-beam U rises, and as soon as the load has passed down the inclines D D' D'' and a portion has escaped at E''' the scale-beam U falls and re-establishes the circuit, attracting the armature and lever K and opening the valve H.

The devices, being substantially of the character hereinbefore described, will operate as follows: The devices, when not in operation, (or when the pan A is not loaded,) will occupy the position shown in Fig. 1, and both of the valves F and H will be open; consequently the common slide-valve or cut-off $l$ must be closed. To set the self-weighing scale in operation, the cut-off $l$ is opened in the usual manner after the weight has been properly arranged on the scale-beam U. The grain or other material then flows into the pan A until nearly the proper amount has been deposited in the pan. Just before the proper weight is reached the pan A rocks forward on axis $b$ (or lever B does, which is the same thing) into the position shown in full line, Fig. 2. This movement withdraws the rod C or support of the counterweighted valve F and allows the main valve to close, which cuts off the main flow of the grain; but as the valve H remains open the weight continues to make. As soon as the full weight is made the scale-beam U rises and breaks the circuit to magnet M, and this valve H is closed, as before pointed out. The movement of lever K in closing valve H causes the lower end, $n$, of the said lever to flirt a little of the grain which is heaped up at one end of pan A toward the axis $a$ of the pan, and this slight change of position of the load is sufficient to cause the pan to tilt on its (second) axis $a$, as shown in dotted lines, Fig. 2, so that the grain or other material is discharged on the upper incline, D, and passes thence over inclines D, D', and D'', until it finally escapes from the scales at E'''. After the load is discharged into the box W it passes down the inclines D D' D'', and when a portion of the discharged load has passed out of the final opening, E''', two things result—namely, first, the receiving-pan A is completely righted, as shown in Fig. 1, and opens the valve F, and the grain again begins to flow from the hopper; second, the scale-beam descends and causes the circuit to magnet M to be completed and the valve H is withdrawn. The time required for the grain to pass down the inclines is sufficient to permit the pan to right itself, as shown in Fig. 1. All the discharged grain passes out of the box W before the weight is fully made, as the inclines are to be of the proper number and the openings in the bottom ends of the proper size to effect this.

The angles of inclination of the inclines D D' D'' may vary considerably, according to the speed with which it is desired to discharge the grain. They may have an inclination of twenty degrees to the horizon, as shown in Fig. 2 of the drawings, or they may have an inclination of forty-five degrees to the horizon, as shown in diagram, Fig. 4, and the openings E E' E'' E''' may extend across the box W and have a width of one and a half ($1\frac{1}{2}$) inch, (more or less;) but as the slope of the inclines and the width of the openings are largely a matter of choice for the constructer, it is evident that they may be widely varied without departing from my invention.

The several operations will be repeated as long as there is any material descending; but the operation of the machine can be arrested at any time by closing the valve $l$.

Having thus described the nature and operation of my invention, what I claim, and desire to secure by Letters Patent, is—

1. In an automatic weighing-scale, the combination, with the scales, of a hopper having a valve, a tilting pan for receiving the material from the hopper, an incline to retard the discharge of the material from the scales while the receiving-pan is righting itself, an electro-magnet for actuating the hopper-valve, and a circuit-breaker operated by the scales, substantially as and for the purposes specified.

2. In an automatic weighing-scale, the combination, with a hopper, of a tilting receiving-pan, a main valve for the hopper actuated by the support of the tilting receiving-pan, and a supplemental hopper-valve controlled by an electro-magnet in circuit with the scale, substantially as and for the purposes specified.

3. In an automatic weighing-scale, the combination, with a scale-beam, of a tilting receiving-pan having two axes, on which it vibrates independently of the scale-beam, and a hopper having a valve actuated by the support of the receiving-pan, substantially as and for the purposes specified.

4. In an automatic weighing-scale, the combination, with a hopper, of a pivoted counterweighted lever, a tilting pan journaled on the lever, a hopper-valve actuated by the support of the receiving-pan, and a platform-scale which supports the counterweighted pivoted support of the tilting pan, substantially as and for the purposes specified.

5. In an automatic weighing-scale, the combination, with a scale, of a hopper, a tilting receiving-pan having a vibrating support, a hopper-valve actuated by the vibrating support of the tilting pan, and a hopper-valve actuated from the scale-beam, substantially as and for the purpose specified.

6. In an automatic weighing-scale, the combination, with a hopper provided with a valve, of a tilting receiving-pan and a lever which operates the hopper-valve, and whose lower end is arranged to shift a portion of the grain in the receiving-pan for disturbing the equilibrium of the pan, substantially as specified.

7. In an automatic weighing-scale, the combination, with a hopper provided with a valve, H, and a tilting pan, A, of the pivoted lever K, having knob $n$, arranged to vibrate in a plane between the hopper and pan, and an electro-magnet, M, and spring L, for actuating lever K, substantially as and for the purposes specified.

8. In an automatic weighing-scale, the combination, with the scale-beam, of the fixed contact-knob and the pivoted lever having a contact-knob at one end and its opposite end arranged in the path of the scale-beam, for making and breaking the contact by the movement of the scale-beam, substantially as and for the purposes specified.

9. In an automatic weighing-scale, the combination of the wire N, knob O, scale-beam U, pivoted lever Q, having contact-knob P at one end and its opposite end arranged in the path of the scale-beam, wire R, battery S, wire T, electro-magnet M, lever K, spring L, and sliding valve H, substantially as and for the purpose specified.

10. In an automatic weighing-scale, the combination of a box, W, platform V, scale-beam U, pivoted lever Q, having contact-knob P at one end and its opposite end arranged in the path of the scale-beam, wire R, battery S, wire T, electro-magnet M, lever K, spring L, sliding valve H, wire N, and knob O, substantially as and for the purposes specified.

11. In an automatic weighing-scale, the combination, with a scale, of a hopper, a tilting receiving-pan, a hopper-valve actuated by a rocking lever on which the pan is mounted, a supplemental hopper-valve, and an electric circuit for actuating the supplemental valve from the scale-beam, substantially as and for the purposes specified.

12. In an automatic weighing-scale, the combination, with a scale, of a tilting pan, a bifurcated lever on which the pan is mounted, and a box arranged beneath the same and having a series of inclines open at their lower ends, substantially as and for the purposes specified.

BEN. R. FOSTER.

Witnesses:
GEORGE N. McKAY,
CLIFFORD W. DARBY.